(12) United States Patent
Usui

(10) Patent No.: US 6,414,630 B1
(45) Date of Patent: Jul. 2, 2002

(54) POSITION DETECTION APPARATUS USED FOR A MOBILE OBJECT

(75) Inventor: Takashi Usui, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/681,374

(22) Filed: Jul. 23, 1996

(30) Foreign Application Priority Data

Aug. 2, 1995 (JP) .............................................. 7-197739

(51) Int. Cl.[7] .................................................. G01S 5/14
(52) U.S. Cl. ................... 342/357.09; 342/455; 701/208
(58) Field of Search ....................... 342/375.06, 357.07, 342/357.08, 357.09, 357.1, 357.13, 455, 457; 701/208

(56) References Cited

U.S. PATENT DOCUMENTS

| | | | | |
|---|---|---|---|---|
| 4,835,537 A | * | 5/1989 | Manion | 342/30 |
| 5,025,261 A | * | 6/1991 | Ohta et al. | 342/357.07 |
| 5,153,836 A | * | 10/1992 | Fraughton et al. | 701/301 |
| 5,317,321 A | * | 5/1994 | Sass | 342/357.08 |
| 5,442,805 A | * | 8/1995 | Sagers et al. | 342/457 |
| 5,689,269 A | * | 11/1997 | Norris | 342/357.08 |

FOREIGN PATENT DOCUMENTS

WO    WO 93/01576    *    1/1993

* cited by examiner

Primary Examiner—Gregory C. Issing
(74) Attorney, Agent, or Firm—Jay H. Maioli

(57) ABSTRACT

A position detection apparatus can accurately detect user's own position and other user's position. The position detection apparatus includes a position detecting means (1) for detecting user's own position, a memory means (2) for storing therein map information, a transmitting-receiving means (4) for transmitting user's own identification data and user's own position information from the position detecting means (1) and receiving other user's identification data and other user's position information and a display means (3) supplied with user'own position information from the position detecting means (1), other user's position information from the transmitting-receiving means (4) and the map information from the memory means (2) and displaying a map on which marks indicating user's or other user's position or user's own and other user's positions are put.

7 Claims, 6 Drawing Sheets

POSITION DETECTION APPARATUS USED FOR A MOBILE OBJECT

BACKGROUND OF THE INVENTION

The present invention relates to a position detection apparatus for use with a mobile object, such as automobiles, airplanes or ships.

FIG. 1 of the accompanying drawings shows a conventional position detection apparatus. This position detection apparatus is mounted on a car when it is in use. A position detecting means 1 detects the position of a car and indicates a detected position of the car in the form of position information comprising latitude and longitude. A memory means 2 comprises a CD-ROM (compact disc-read-only memory) and a CD-ROM player for reproducing the CD-ROM. Map data of every place are stored in the CD-ROM. The memory means 2 is controlled by detected position information from the position detecting means 1 and position information entered by the operator so that a map is selected from the CD-ROM in accordance with latitude and longitude of that position information and a reduced scale selected by the operator. Selected map information is supplied to a display means 3. On the other hand, the detected position information from the position detecting means 1 also is supplied to the display means 3 and displayed on the map as a mark such as an arrow by the display means 3. AS the display means 3, there may be used a cathode-ray tube, a liquid-crystal display device, a plasma display device, etc.

A GPS receiver, which is an example of the position detecting means 1, will be described with reference to FIG. 2. Before describing the GPS receiver, a meaning and a measuring principle of the GPS will be described below in brief. Officially, GPS is referred to as "NAVSTAR/GPS", and "NAVSTAR/GPS" is a combination of capital letters of NAVigation system with Time And Ranging/Global Positioning System. According to the measuring principle of the GPS, delay times of radio waves transmitted to the Earth from a plurality of GPS satellites orbiting the Earth are measured, and the position of a mobile object is measured by obtaining a present position of a mobile object on the Earth from the orbits of the GPS satellites. The position of the mobile object on the Earth can be obtained by measuring distances among the three GPS satellites and the present position of the mobile object on the Earth based on radio waves transmitted from the three GPS satellites. Furthermore, since a common error caused by errors of clocks of GPS receivers can be eliminated by measuring distances among four GPS satellites and the present position of the mobile object on the Earth, latitude, longitude and altitude of the position of the mobile object on the earth can be measured.

In FIG. 2, reference numeral 10 depicts an antenna for receiving radio waves from a GPS satellite (not shown). A microstrip antenna, for example, may be used as the antenna 10. A reception signal (spectrum diffusion signal) of 1.2 GHz or 1.5 GHz received at the antenna 10 is supplied through a coaxial cable (not shown) to a receiving unit 11, in which it is converted into an intermediate frequency signal with a low frequency. The intermediate frequency signal is supplied to a signal processing unit 12, in which it is spectrum-inverse-diffused to provide a message signal, a pseudo-distance signal and a code control signal. The signal processing unit 12 calculates a pseudo-distance by synchronizing the intermediate frequency signal based on the reception signal from the GPS satellite and a PRN (pseudo random noise) code generated therein. The message signal and the pseudo-distance signal are supplied to a microcomputer 13, in which they are computed for obtaining the present position of the mobile object. Therefore, there are obtained position data output (including data such as latitude, longitude, altitude, azimuth or speed).

The microcomputer 13 judges a GPS satellite which is able to receive radio waves at that time based on a clock signal from a clock circuit 14 belonging to the microcomputer 13 and almanac (calendar) data from the GPS satellite, and supplies the code control signal to the signal processing unit 12 based on a judged result thereby to generate the PRN code of the GPS satellite capable of receiving the radio wave. Then, position information from the output side, i.e, an output terminal 15 of the microcomputer 13 is supplied to the display means 3 (see FIG. 1) as described above.

When people are going to a destination by their own cars, they are communicating with each other through radio transmitter-receiver. Further, when a taxi control center issues commands to taxis with radio transmitter-receivers or taxis with radio transmitter-receivers communicate with each other, radio transmitter-receivers are used similarly.

If the position detection apparatus mentioned in the preamble is mounted on the car, then the present position of the car with the position detection apparatus mounted thereon can be detected clearly. However, only by the radio communication, it is impossible to accurately detect the positions of other cars and taxis.

SUMMARY OF THE INVENTION

In view of the aforesaid aspect, it is an object of the present invention to provide a position detection apparatus which can accurately detect user'own position and other user's position.

According to an aspect of the present invention, there is provided a position detecting apparatus for a mobile object which is comprised of position detecting means mounted on a first mobile object for detecting a position of the first mobile object, transmitting-receiving means for transmitting position information of the first mobile object detected by the position detecting means and receiving position information of a second mobile object transmitted from the second mobile object, memory means for storing map information, and display means supplied with the position information of the first mobile object from the position detecting means, the position information of the second mobile object from the transmitting-receiving means and map information read out from the memory means in response to the position information of the first or second mobile object and displaying a map on which a mark indicative of the position of the first mobile object and/or the position of the second mobile object is put.

According to the present invention, user's own position information from the position detecting means, other user's position information from the. transmitting-receiving means and the map information from the memory means are supplied to the display means and thereby a map with marks indicating user's own position or other user's position or user's and other user's position put-thereon is displayed.

BRIEF:DESCRIPTION OF THE DRAWINGS

DETAILED DESCRIPTION OF THE PREFERRED EMBODIMENTS

Embodiments of the present invention will be described hereinafter with reference to the drawings.

Figure 1:
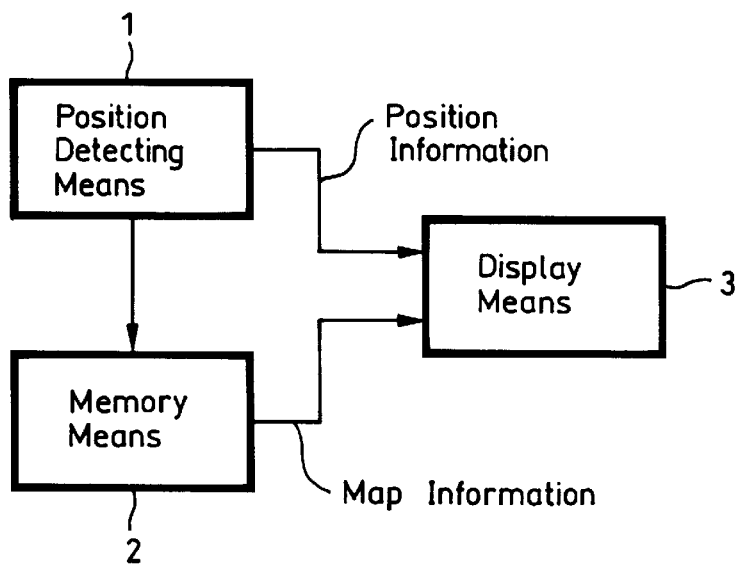
FIG. 1 is a schematic block diagram showing a conventional position detection apparatus.
Figure 2:
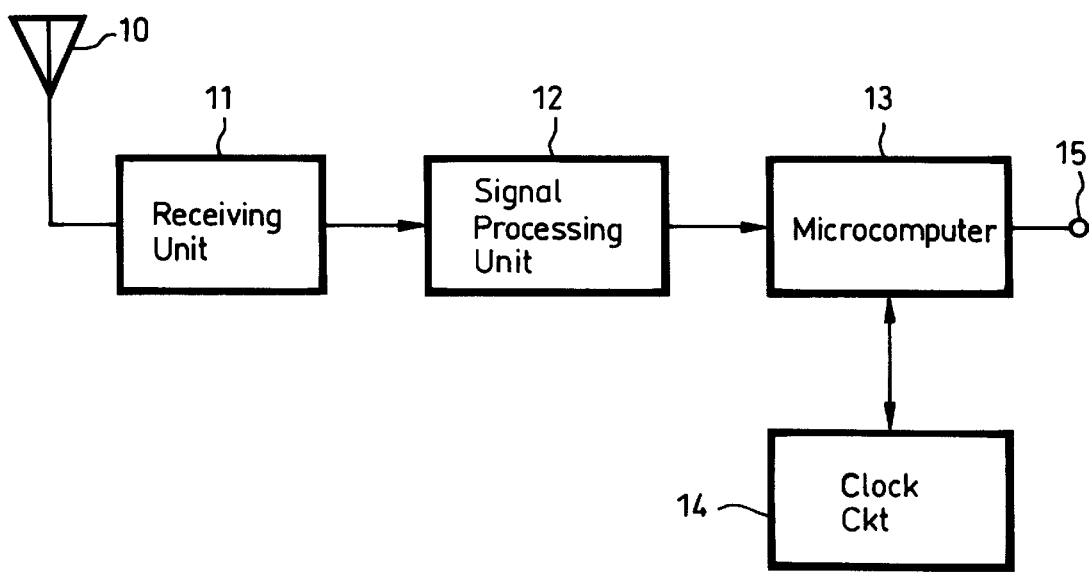
FIG. 2 is a schematic block diagram showing a GPS receiver.
Figure 3:
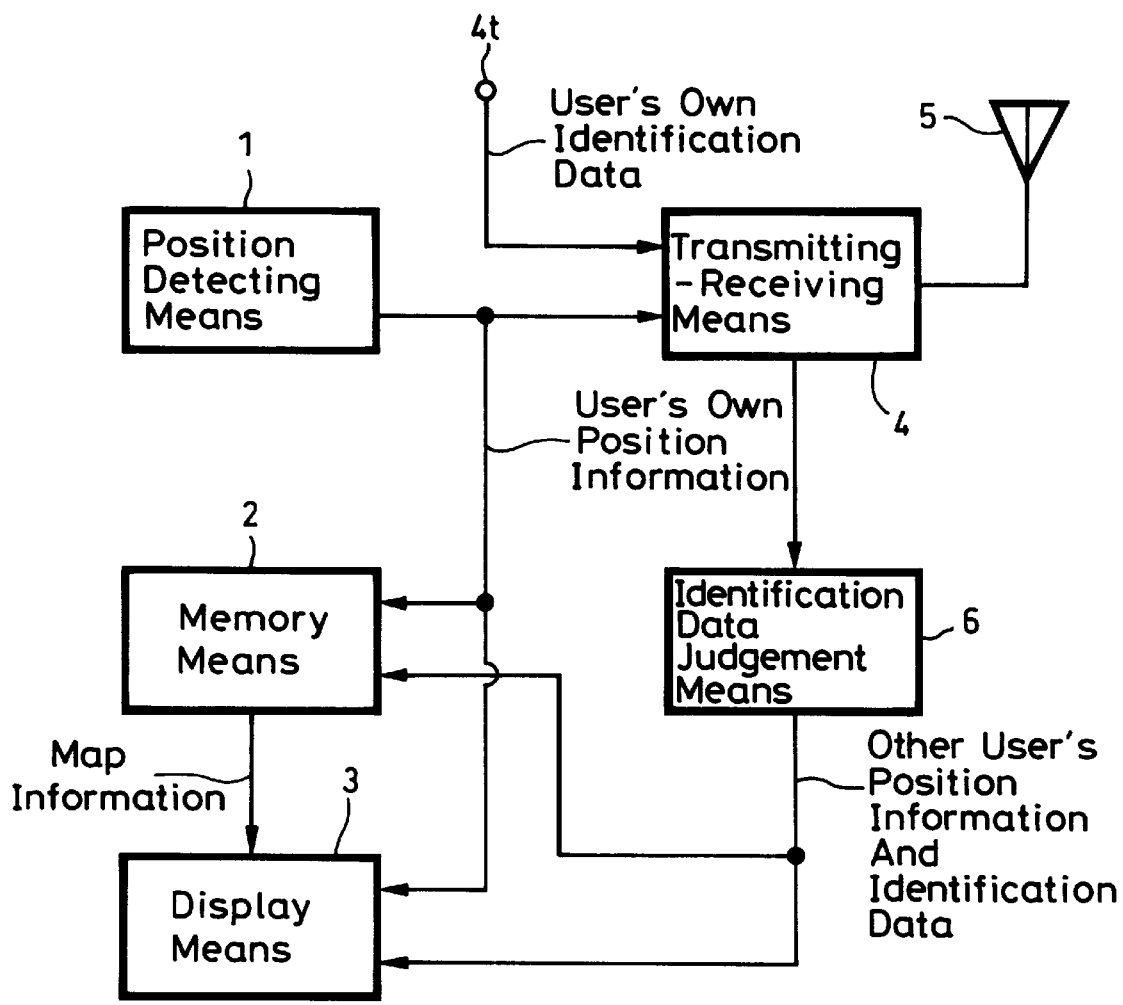
FIG. 3 is a schematic block diagram showing a position detection apparatus according to a first embodiment of the present invention.
Figure 4:
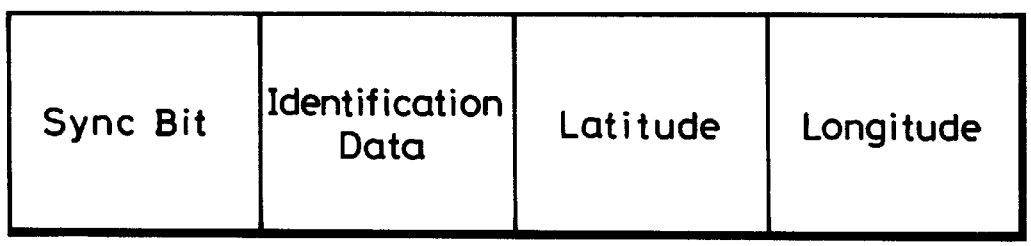
FIG. 4 is a diagram showing a format of packet communication.

Initially, a position detection apparatus according to a first embodiment will be described with reference to FIG. 3. In FIG. 3, the GPS receiver shown in FIG. 2 is used as a position detecting means 1. A memory means 2 is a CD-ROM in which map information of every place are stored and a CD-ROM player. Position information from operator's car is supplied from the position detecting means 1 to the memory means 2. Then, the position information and map information selected by the operator are supplied to a display means 3 such as a cathode-ray tube, a liquid-crystal display device or a plasma display. At that time, position information of operator's car is supplied from the position detecting means 1 to the display means 3 and thereby displayed as a mark such as an arrow on the map.

A transmitting-receiving means 4 having an antenna 5 transmits the position information from the position detecting means 1 and identification data for operator's own car inputted to an input terminal 4t at every predetermined time with an interval of several seconds and receives position information from a position detection apparatus of other user's car and identification data for identifying other user's car. These signals thus transmitted and received are spectrum diffusion modulation signals of packet signal comprising sync bit, identification data, latitude and longitude. The sync bit is used to synchronize bits when the packet signal is received. Since a communication based on a spectrum diffusion modulation communication is strong against disturbance and interference from other radio waves, there is then the advantage that a service area of radio communication, i.e., a range in which radio waves can reach can be widened.

Figure 5:
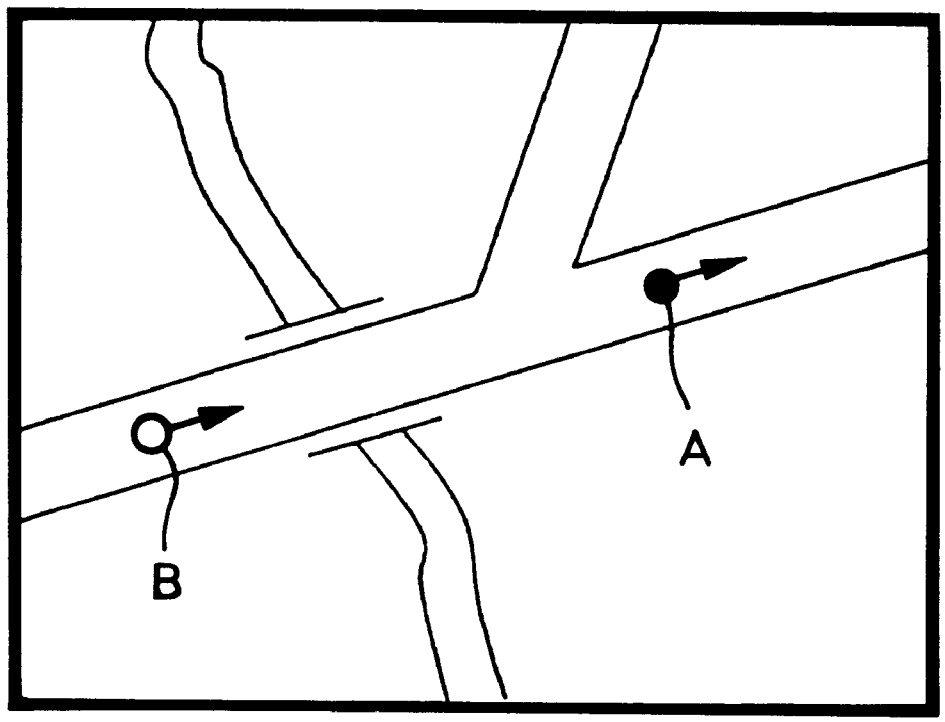
FIG. 5 is a diagram showing an example of map information displayed on a picture screen of a display means.

The reception signal received by the transmitting-receiving means 4 is demodulated and thereby position information and identification data of one or a plurality of other users'cars are obtained. The position information and the identification data are supplied to an identification data judgement means 6, and the identification data judgement means 6 determines whether or not the identification data is predetermined identification data. If it is determined by the identification data judgement means 6 that the identification data is the predetermined identification data, then position information of the identification data is supplied to the memory means 2 and map information corresponding to the position information is read out from the memory means 2 and supplied to the display means 3. Also, the identification data is supplied to the display means 3 and thereby displayed on a map as a mark different in shape and color from user's own position information. Accordingly, identification data and position information other than the predetermined identification data are rejected by the identification data judgement means 6. When a distance between user's own car and other user's car is short, position information of user's own car and position information of other user's car are displayed on the same map as distinguishable marks A and B as shown in FIG. 5. When on the other hand such distance is long, they are displayed on different maps separately.

Figure 6:
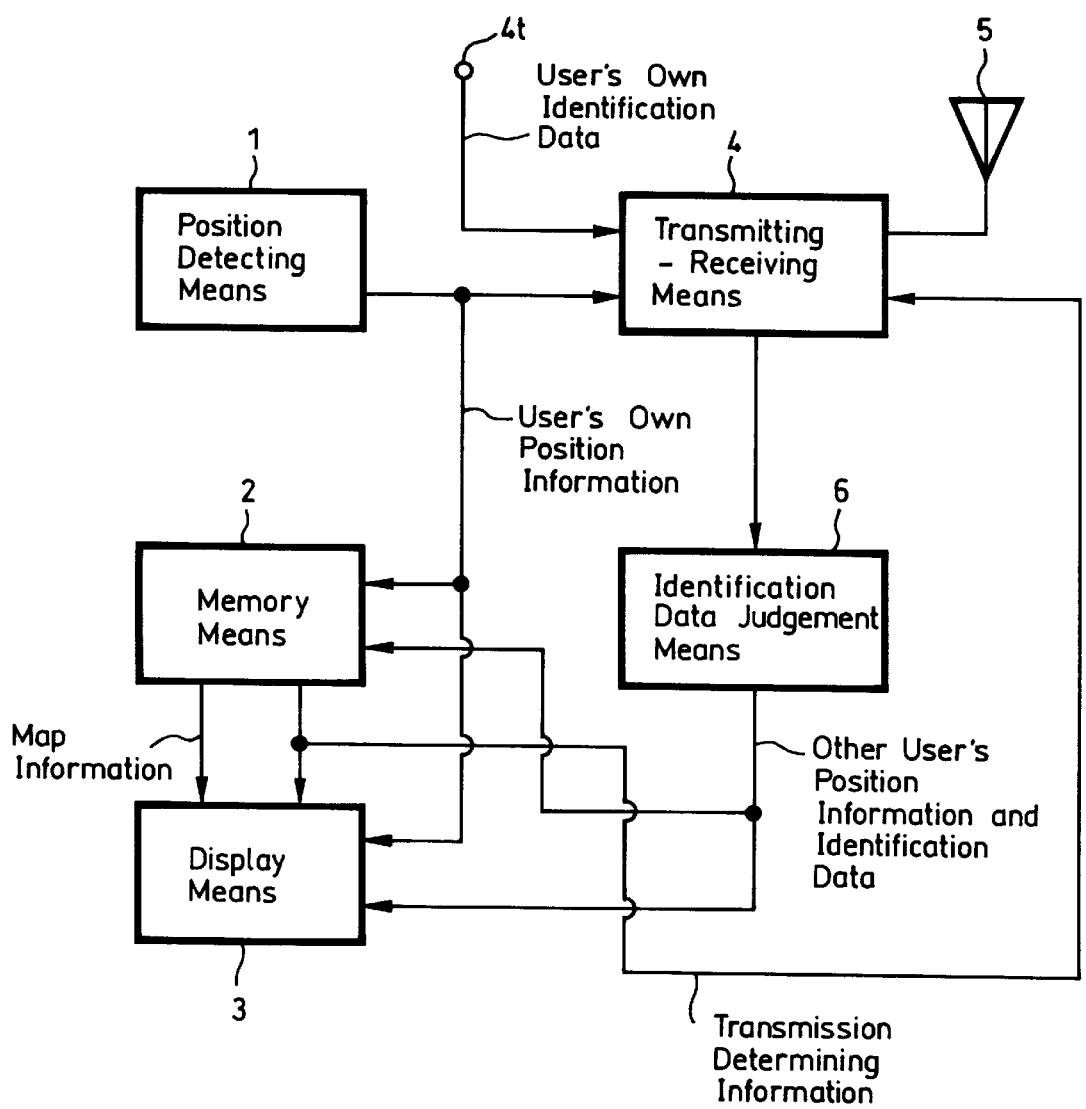
FIG. 6 is a schematic block diagram showing a position detection apparatus according to a second embodiment of the present invention.
Figure 7:
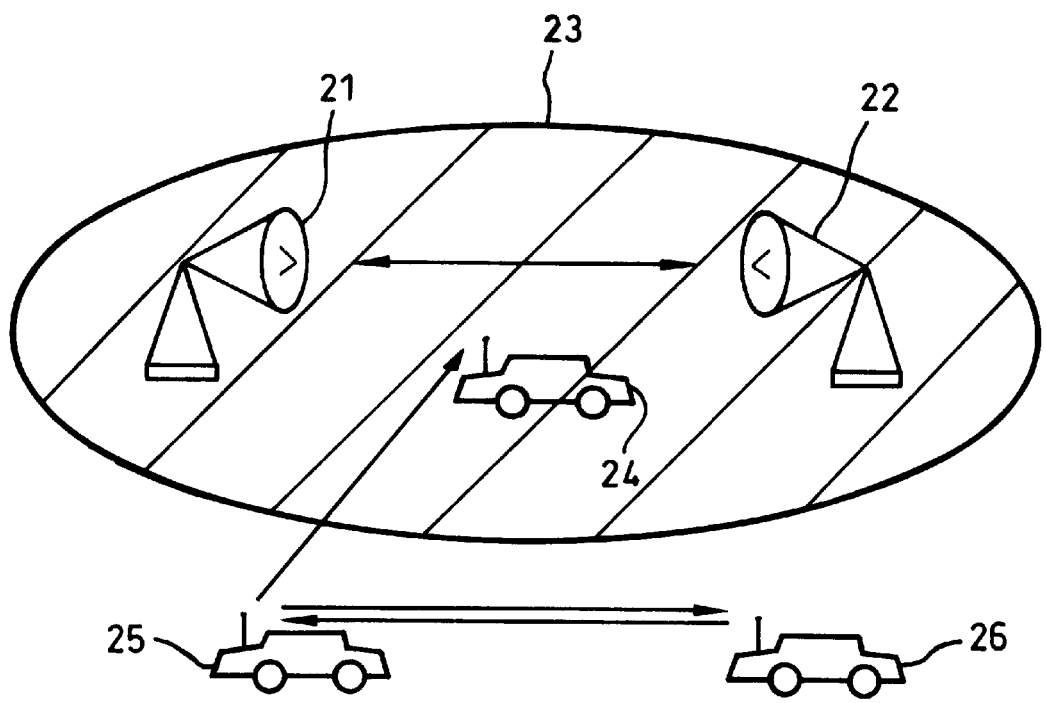
FIG. 7 is a pictorial representation used to explain a relationship between a service area of a communication system and mobile objects.

A second embodiment of the present invention will be describe with reference to FIG. 6. Before describing the second embodiment of the present invention, a relationship between a service area of a communication system and mobile objects will be described with reference to FIG. 7.

in FIG. 7, reference numerals 21, 22 depict transmitting-receiving antennas of microwave communication system disposed with a predetermined distance therebetween. Reference numeral 23 depicts a service area for the transmitting-receiving antennas 21, 22. In the service area 23, in order to prevent a communication from being hindered by disturbance and interference of radio waves, the transmission of radio waves is inhibited withing the service area. This will be described specifically below. In FIG. 7, reference numeral 24 depicts a car running within the service area 23, and reference numerals 25, 26 denote cars running outside the service area 23. The cars 25, 26 which are running outside the service area 23 are able to transmit and receive information therebetween by means of a communication device (radio transmitter-receiver). Further, between the car running within the service area 23 and the car running outside the service area 23, e.g., the car 25, the car 25 can transmit information to the car 26 by means of the communication device. However, the transmission of information from the car 24 to the car 25 is inhibited.

Therefore, in the second embodiment shown in FIG. 6, transmission-inhibited area information is contained in map information stored in CD-ROM of the memory means 2. When a car is in the transmission-inhibited-area, transmission is automatically stopped. Specifically, a position detecting means 1 detects position ($\theta$, $\phi$) of the user's own car and a memory means 2 selects map information based on the detected position ($\theta$, $\phi$). In that case, transmission determining information z (when the transmission determining information z is "1", transmIssion is permitted, and when it is "0", transmission is inhibited) is obtained from the map information and supplied to a transmitting-receiving means 4 whose transmission is controlled. Specifically, when the transmission determining information is inhibited, the transmission of the user's own identification data and user's own position information is transmitted. When the transmission determining information is permitted, it is needless to say that user's own identification data and user's own position information are transmitted from the transmitting-receiving means 4. In FIG. 6, a rest of the arrangement is similar to that of FIG. 3 and therefore need not be described in detail.

Figure 8:
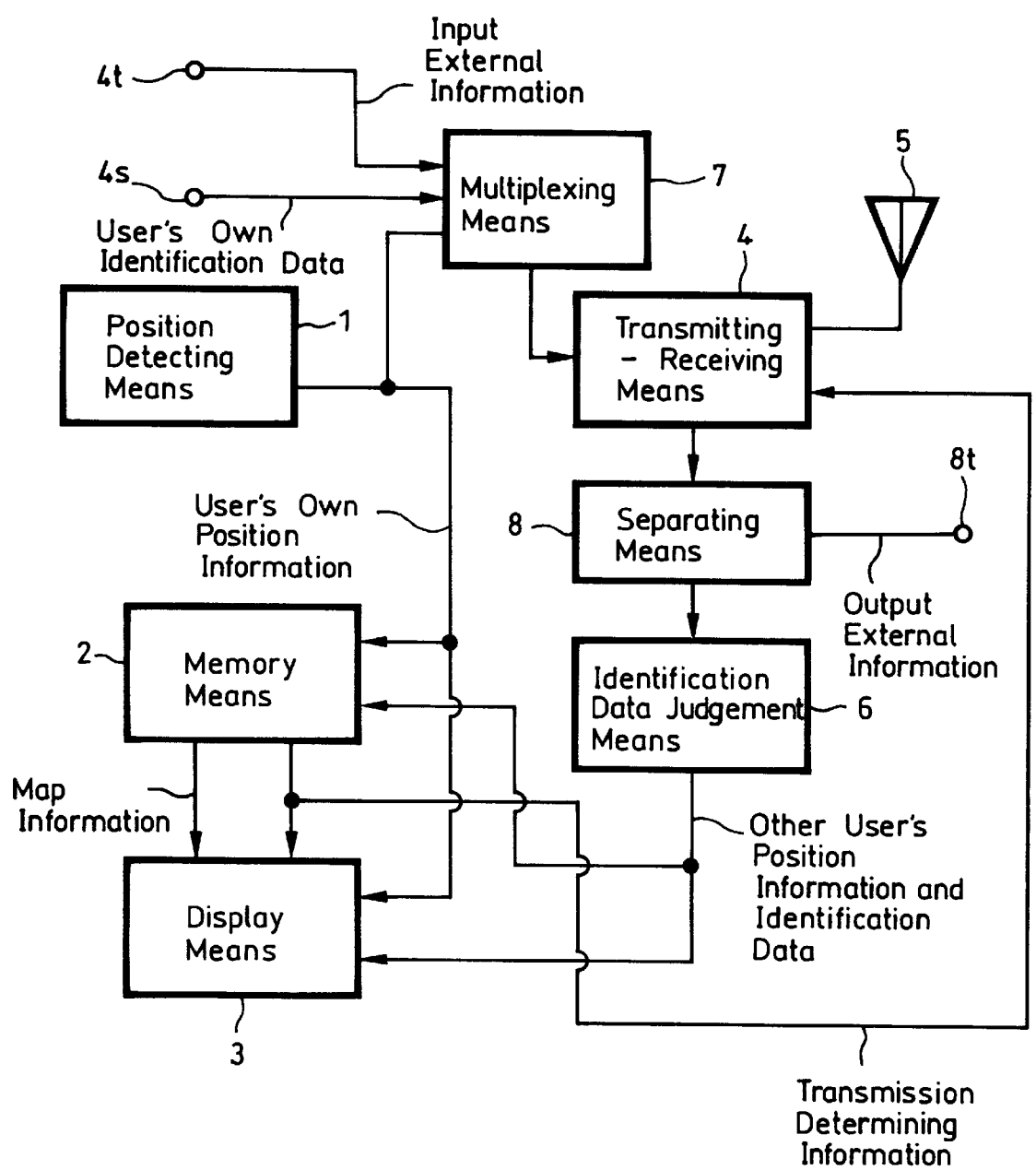
FIG. 8 is a schematic block diagram showing a position detection apparatus according to a third embodiment of the present invention.

A third embodiment of the present invention will be described with reference to FIG. 8. While user's own identification data and position information are transmitted by the transmitting-receiving means 4 and the antenna 5 and other user's identification data and position information are received by the transmitting-receiving means 4 and the antenna 5 in the first and second embodiments shown in FIGS. 3 and 6, according to the third embodiment shown in FIG. 8, any one of an audio signal, a video signal with or without an audio signal, a facsimile signal and a text data signal or a plurality of external information are transmitted and received. Therefore, user's own position information from the position detecting means 1, user's own identification data from the terminal 4s and inputted external information from the terminal 4t are multiplexed by a multiplexing means 7 and supplied to the transmitting-receiving means 4 and thereby transmitted from the antenna 5. Further, there is provided a separating means 8. A multiplexed signal of one or a plurality of other users'position information, other user's identification data and outputted external information received by the antenna 5 and the transmitting-receiving means 4 is supplied to and separated by the separating means 8, whereby the outputted external information is outputted from an output terminal 8t and other user's position information and other user's identification data are supplied to the identification data judgement means 6. In FIG. 8, a rest of the arrangement is similar to that of FIG. 3 and therefore need not be described in detail.

User's own and other user's own (one or a plurality of) position information and identification data may be fixed or movable.

According to the first invention, since the position detection apparatus includes the position detecting means for detecting user's own position, the memory means for storing therein map information, the transmitting-receiving means for transmitting user's own identification data and user's own position information from the position detecting means and receiving other user's identification data and other user's position information and the display means for receiving user's own position information from the position detecting means, other user's position information from the transmitting-receiving means and the map information from the memory means and displaying a map on which marks indicating user's own position or other user's position or user's and other user's positions are indicated, it is possible to obtain the position detection apparatus which can accurately detect not only user's own position but also other user's position. Therefore, if user and other user are both mobile objects, i.e., cars and they are going to a common destination by their cars, the user and other user can know user's or other user's wrong course. Accordingly, if the user and other user can communicate with each other by an audio signal, it becomes easy to correct the user's or other user's wrong course. When the present invention is applied to the taxi service control system in which the taxi service control center issues commands to a plurality of taxis or a delivery service control center issues commands to a plurality of delivery service tracks, the taxi service control center and the delivery service control center side can accurately confirm the positions of the taxis and the delivery service tracks so that the taxis service control center and the delivery service control center can issue commands more easily.

According to the second invention, in the position detection apparatus according to the first invention, the transmission-inhibited area information is contained in the map information stored in the memory means. When the user's position lies in the transmission-inhibited area, the transmission of user's position is inhibited by supplying the transmission-inhibited information from the memory means to the transmitting-receiving means. Therefore, in addition to the effects achieved by the first invention, when the user's position lies in the transmission-inhibited area, the transmission of user's identification data and user's position information from the transmitting-receiving means can be inhibited automatically.

According to the third invention, in the position detection apparatus according to the present invention, since user's own identification data and user's own position information and other information from the position detecting means are transmitted and other user's identification data, other user's position information and other user's other information are received by the transmitting-receiving means, in addition to the effects achieved by the first invention, it becomes possible to transmit and receive other information. Therefore, when user and other user are both mobile objects, e.g., cars and they are going to a common destination by cars, since the user or other user can know user's or other user's wrong course, if the user and other user can communicate with each other by an audio signal or the like through transmission and reception of other information, then it becomes possible for user and other user to communicate with each other without providing radio transmitter and receiver separately.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A position detecting apparatus for a mobile object comprising:

position detecting means mounted on a first mobile object for detecting a position of said firs: mobile object;

transmitting-receiving means for transmitting position information of said first mobile object detected by said position detecting means and receiving position information of a second mobile object transmitted from said second mobile object;

memory means for storing map information; and display means supplied with said position information of said first mobile object from said position detecting means, the position information of said mobile object from said transmitting-receiving means and map Information read out from said memory means in response to said position information of one of said first and second mobile objects and for displaying a map on which a mark indicative of the position of said first mobile object and/or the position of said second mobile object is put, wherein said transmitting-receiving means transmits the position information of said first mobile object detected by said position detecting means and identification data of said first mobile object and receives the position information of said second mobile object and identification data of said second mobile object transmitted from said second navigation object, and said position detection apparatus includes identification data judging means for supplying the position information of said second mobile object to said memory means when said identification data judging means determines that the identification data of said second mobile object is predetermined identification data.

2. A position detection apparatus for a mobile object as claimed in claim 1, wherein when said identification data judging means determines that the identification data of said second mobile object is said predetermined identification data, then the identification data of said second mobile object is supplied to said display means and said second mobile object is displayed on said display means with a mark different from that of said mobile object.

3. A position detection apparatus for a mobile object as claimed in claim 1, wherein said transmitting-receiving means transmits the position information of said first mobile object, the identification data of said mobile objects and other information, and receives the position information of said second mobile object, the identification data of said second mobile object and other information.

4. A position detection apparatus for a mobile object as claimed in claim 3, wherein said other information is audio information.

5. A position detection apparatus for a mobile object as claimed in claim 1, wherein when a distance between said first and second mobile object is relatively short, said marks indicating said first and second mobile objects are displayed on the same map, and when a distance between said first and second mobile objects is relatively long, said marks indicating said first and second mobile objects are respectively displayed on different maps.

6. A position detection apparatus for a mobile object as claimed in claim 1, wherein the map information stored in said memory means contains information of transmission-inhibited area in which a transmission is inhibited, and when said first mobile object lies in said transmission-inhibited area, the information of said transmission-inhibited area is supplied from said memory means to said transmitting-receiving means thereby to inhibit a transmission operation of said transmitting-receiving means.

7. A position detection apparatus for a mobile object as claimed in claim 1, wherein said position detecting means obtains information of position, latitude and longitude of said first mobile object by receiving radio waves from a plurality of satellites.

* * * * *